Sept. 18, 1928.
T. D. KELLY
1,685,029
AIRCRAFT
Filed Nov. 1, 1926    2 Sheets-Sheet 1
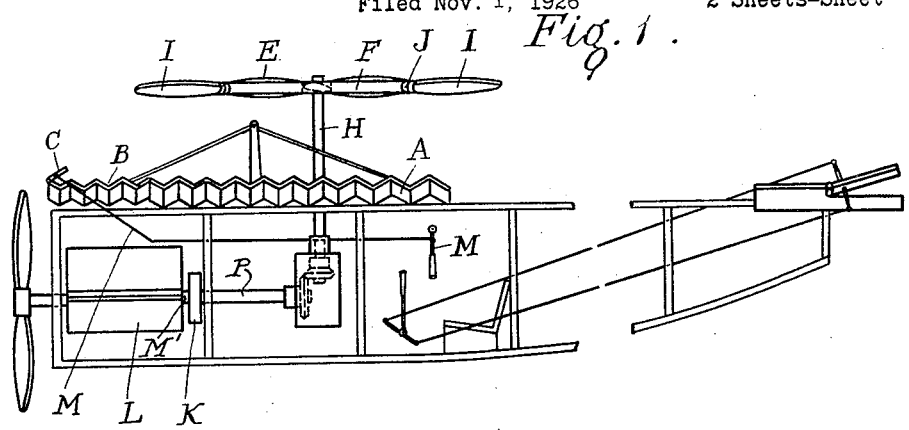
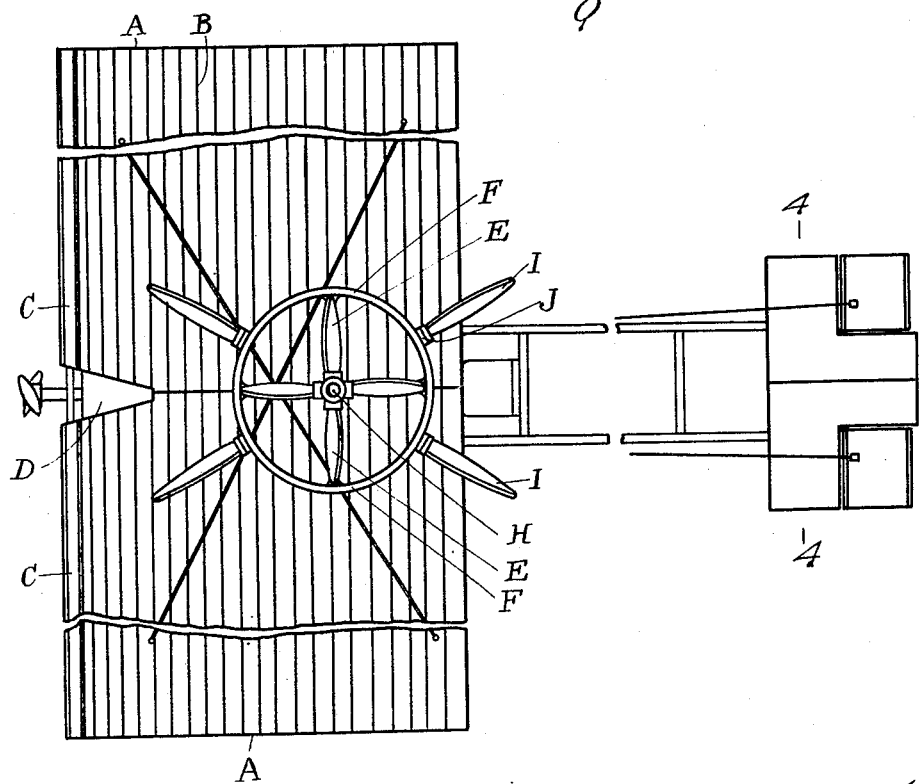

Sept. 18, 1928.
T. D. KELLY
1,685,029
AIRCRAFT
Filed Nov. 1, 1926    2 Sheets-Sheet 2
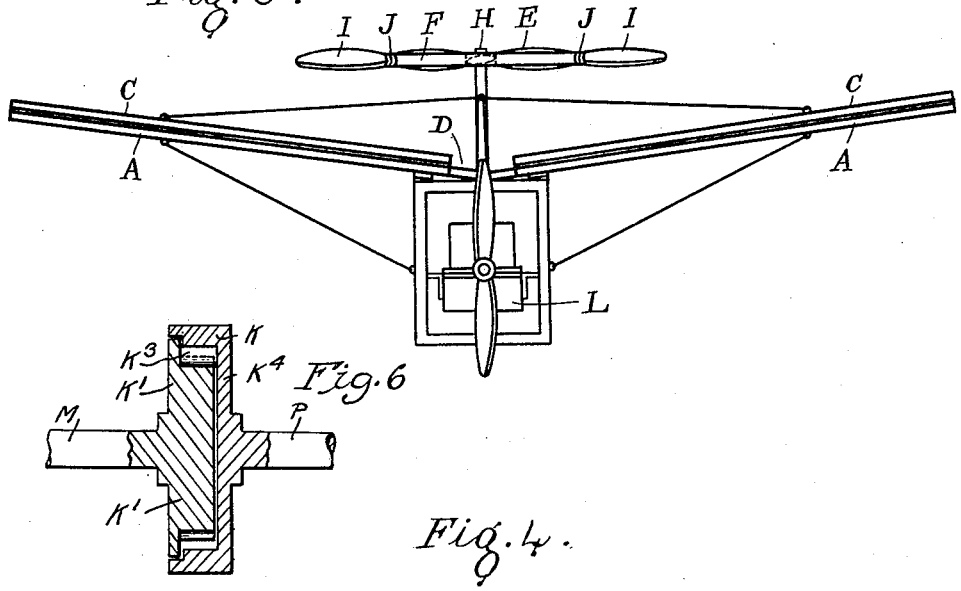
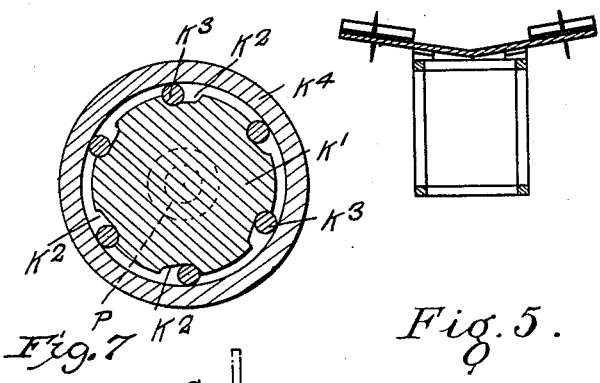
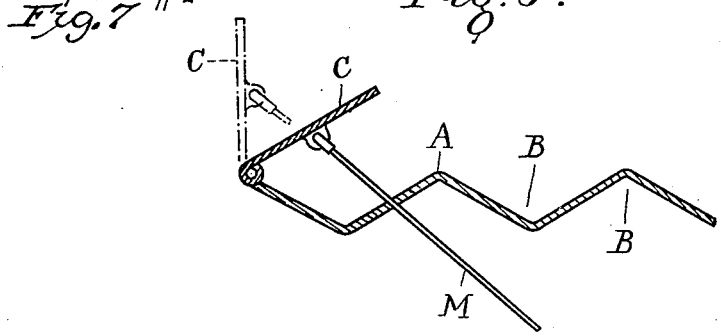
Inventor
Thomas D. Kelly,
By
Attorney Patented Sept. 18, 1928.

1,685,029

UNITED STATES PATENT OFFICE.

THOMAS DANIEL KELLY, OF LONDON, ENGLAND.

AIRCRAFT.

Application filed November 1, 1926, Serial No. 145,598, and in Great Britain November 2, 1925

In British Patents Nos. 101,442 and 111,-128 I have described means in an aircraft for obtaining greater lift for a given area with increased stability by constructing pockets on top and underneath the wings, so that a partial vacuum will be created, when the aircraft is in motion, all over the surface of the wings at any angle.

According to the present invention wings of the type disclosed in said patents are set at a dihedral angle to each other and the front edge of each wing is provided with a leading in strip which preferably is hinged to the wings so as to be positioned for braking purposes. Such wings are used in connection with horizontal propellers driven by an engine for direct vertical lift, the propellers being automatically disconnected by an over-running clutch to work with wind pressure when the machine is in motion. I thus produce a combination of helicopter comprising rotating wings and stationary planes with pockets to create a partial vacuum. Under ordinary circumstances helicopters having rotating planes are sufficient if direct vertical ascent and descent is all that is required, but since ordinary planes are necessary for lateral balancing it is advantageous to so form them as to give increased lift for their area as well as to permit slow descent in case of accident to the engines, helicopters or rotating planes, or where there is not sufficient wind pressure to work the rotating planes rapidly enough, in which case, if the engine is stopped, the machine must crash unless there are supporting planes of the type described.

My invention will be more clearly understood from the following description aided by the annexed drawings in which, in a diagrammatical maner, I illustrate a construction embodying my invention.

Figure 1 is a side elevation (broken); Figure 2 is a plan (broken) and Figure 3 is a front elevation of sufficient parts of an aircraft to illustrate my invention.

Figure 4 is a section on the line 4—4 of Figure 2.

Figure 5 is a sectional elevation, on a larger scale than in the other figures, of the leading in strip and a position of a wing.

Figure 6 is a cross-sectional view through the one-way clutch and the shafts that the same connects.

Figure 7 is a transverse sectional view through the clutch per se.

According to this invention a considerably improved effect and perfect control is obtained if the pockets, underneath recesses, or hollows are formed both above and underneath the wings A, preferably by means of shallow corrugations B, the wings A, A being set at a dihedral angle, as shown in Figure 3, with tapering leading in edges or strips C to direct the air over the pockets or the like, an opening D being formed in the centre of the leading in edge in order that the air can flow along the sides of the pockets at the centre of the machine where the two wings A, A form the dihedral angle. The wings A, A can be rigidly or flexibly attached to the central portion.

If the wings are constructed in this manner tandem wings, two, three, four or more in one or more tiers (termed monoplane, biplane, triplane) controlled by vertical and horizontal rudders of the usual type, can be used and any desired increase in lift can be obtained by increasing the length of the machine with tandem wings of this type, instead of increasing the width of the wings as is now the case. Tandem wings are not possible with the type of stationary plane at present in use because the following wing has no lift.

Horizontal propellers for direct vertical lift can be used very efficiently and with safety in combination with this type of wing and, in order that the large diameter propellers having great tensile strength and light weight necessary for this purpose may be used, the horizontal propellers are formed of blades E connected at their outer ends by an encircling ring F and connected at their inner ends to a boss or shaft H, the blades E having a diameter at their extremities of say 6 ft. The ring F which connects the outer ends of the blades E carries two, three or more blades I flexibly attached at their inner ends J to the ring making the total diameter of the propeller (which is thus a combined helicopter with flexible blades) say 12 ft. The blades E are connected to their shaft H by means of a one way or free wheel clutch K, so that they can be driven by an engine L for direct vertical lift and be automatically actuated by wind currents for descending when the machine is in horizontal flight.

The clutch K, as illustrated in Figures 6 and 7, comprises a disk K' secured to the engine shaft M' and having a plurality of eccentric recesses K² in its periphery, rollers K³ in said recesses, and an encasing member K⁴ secured to the driven shaft P and having a flange surrounding the periphery of the disk K'. When the disk K' is driven by the engine in a counter clockwise direction (Fig. 7) the rollers K³ will be wedged between the periphery of the disk K' and the flange of the encasing member K⁴ and thus motion will be transmitted from the engine shaft M' to the driven shaft P. When the shaft P rotates at a greater speed than the engine shaft M' the rollers K³ will be moved out of engagement with the flange of the encasing member K⁴ so that the encasing member and the driven shaft P will be free to rotate at a greater speed than the disk K' and the engine shaft M'.

A braking effect is obtained (if the machine is required to be kept stationary for hovering) by hinging the leading in edges or strips C of the stationary wings so that they can be positioned by the pilot at a right angle to the rest of the wings in opposition to the air by means of lever mechanism M. The moving machine will not nose dive, but its horizontal flight may be quickly checked, and if the engine L is stopped, drops to the ground somewhat after the manner of a parachute, the pockets underneath the wings A, A creating the necessary pressure to support it sufficiently to effect a slow descent vertically, if it has no horizontal propellers or if they are not working through insufficient wind pressure, as in a calm. But if the engine is kept in operation the blades of the propelling screw and the lifting propeller set up air currents at right angles to each other and since in that case the machine is not able to move forward on account of the braking action set up by the folded stationary wings it remains stationary at any desired height.

Separate engines can be used for actuating the propelling screw and the lifting screw, or one engine can actuate both by means of clutches.

A machine having wings of the type just described can be caused by means of the rudders to turn corners on an even keel without banking. There is no necessity for ailerons, wing flaps, or flexing the wings.

What I do claim as my invention and desire to secure by Letters Patent is:—

1. An aircraft having a frame, wings arranged in pairs and mounted in the frame, said wings being at a dihedral angle to each other, and provided with a gap in the centre of the front edges of the wings, a braking strip hinged to the front edge of each of the wings, and means for regulating the angularity of said strips.

2. An aircraft having stationary wings provided with recesses and set at a dihedral angle to each other with a gap in the center of the front edge thereof, a helicopter surmounting the wings and comprising a horizontal propeller having fixed blades, a ring surrounding the fixed blades, a plurality of flexible blades surrounding and attached to the ring, a motor, and a one-way clutch connecting the helicopter with the motor.

In testimony whereof I have hereunto set my hand.

THOMAS DANIEL KELLY.